United States Patent
Partridge et al.

(10) Patent No.: US 6,657,646 B2
(45) Date of Patent: Dec. 2, 2003

(54) SYSTEM AND METHOD FOR MULTIMEDIA DISPLAY

(75) Inventors: Charles W. Partridge, Wylie, TX (US); Ronald W. Barber, Plano, TX (US); Mark R. Lee, Richardson, TX (US); Douglas R. Holub, Irving, TX (US)

(73) Assignee: AMX Corporation, Richardson, TX (US)

(*) Notice: Subject to any disclaimer, the term of this patent is extended or adjusted under 35 U.S.C. 154(b) by 0 days.

(21) Appl. No.: 09/328,039

(22) Filed: Jun. 8, 1999

(65) Prior Publication Data
US 2002/0054160 A1 May 9, 2002

(51) Int. Cl.[7] .................................................. G09G 5/00
(52) U.S. Cl. ................ 345/835; 345/764; 345/765; 345/840; 345/760; 345/619
(58) Field of Search ................ 345/764, 765, 345/835, 840, 562, 522, 634, 760, 619, 625, 537, 502, 589, 593, 597

(56) References Cited

U.S. PATENT DOCUMENTS

| | | | | |
|---|---|---|---|---|
| 5,737,553 A | * | 4/1998 | Bartok | 395/339 |
| 5,926,187 A | * | 7/1999 | Kim | 345/435 |
| 5,935,003 A | * | 8/1999 | Stephens et al. | 463/31 |
| 5,943,064 A | * | 8/1999 | Hong | 345/502 |
| 5,977,989 A | * | 11/1999 | Lee et al. | 345/503 |

FOREIGN PATENT DOCUMENTS

| | | |
|---|---|---|
| EP | 0 658 899 A2 | 6/1995 |
| EP | 0 915 469 A2 | 5/1999 |
| WO | WO 98/11510 | 3/1998 |

OTHER PUBLICATIONS

D. Goodman, "Chapter 10: All About Buttons," The Complete Hypercard Handbook, Bantam Computer Books (US), p. 161–183, (Dec. 19, 1988).

* cited by examiner

*Primary Examiner*—Kristine Kincaid
*Assistant Examiner*—Mylinh Tran
(74) *Attorney, Agent, or Firm*—Gardere Wynne Sewell LLP

(57) ABSTRACT

A system of multimedia display on a monitor screen includes at least one graphics source, a display file defining a page having a plurality of buttons, where each button has a set of properties including a specification of a graphics source. The system further includes a graphics controller operable to generate a pixel map, and a graphics arbitrator coupled to the graphics controller operable to select pixels between the pixel map and pixels from the at least one graphics source to be displayed for the page according to the display file.

27 Claims, 4 Drawing Sheets

SYSTEM AND METHOD FOR MULTIMEDIA DISPLAY

TECHNICAL FIELD OF THE INVENTION

This invention is related in general to the field of control systems, particularly to a system and method of multimedia display.

BACKGROUND OF THE INVENTION

In a control area network connecting various control devices, a monitor or user display device is often used to provide a current status information about the control area network. In many instances, it becomes desirable to feed multiple graphics information from a number of sources to the monitor for display simultaneously.

SUMMARY OF THE INVENTION

It has been recognized that it is desirable to provide a multimedia display on a monitor.

In one aspect of the invention, a system of multimedia display on a monitor screen includes at least one graphics source, a display file defining a page having a plurality of buttons, where each button has a set of properties including a specification of a graphics source. The system further includes a graphics controller operable to generate a pixel map, and a graphics arbitrator coupled to the graphics controller operable to select pixels between the pixel map and pixels from the at least one graphics source to be displayed for the page according to the display file.

In another aspect of the invention, a control area network having a multimedia display includes a master controller coupled to the control area network, and at least one control device coupled to the master controller via the control area network. The at least one control device includes at least two graphics sources, a display file defining a page having a plurality of buttons, each button having a set of properties including a specification of a graphics source, a graphics controller operable to generate a pixel map. A graphics arbitrator is coupled to the graphics controller and is operable to select pixels between the pixel map and pixels from the at least two graphics sources to be displayed on a monitor screen for the page according to the display file.

In yet another aspect of the invention, a method of multimedia display on a monitor screen includes composing a display file describing multiple buttons, each button having a set of properties including a specification of a graphics source, receiving a pixel from each graphics source, and generating a corresponding pixel in response to the display file. The generated pixel is then examined and a pixel is selected from the generated pixel and the corresponding pixels from the graphics sources in response to examining the generated pixel. The selected pixel is displayed on the monitor screen.

In yet another aspect of the invention, a method of multimedia display on a touch monitor screen in a control area network is provided. The method includes the steps of composing a display file describing multiple buttons, each button having a set of properties including a specification of a graphics source coupled to the control area network. Thereafter, the method includes receiving a pixel from each graphics source, generating a corresponding pixel in response to the display file, and examining the generated pixel. A pixel is then selected from the generated pixel and the corresponding pixels from the graphics sources in response to examining the generated pixel.

One technical advantage of the invention is the ability to display graphics content from multiple sources on a single page on a monitor screen.

BRIEF DESCRIPTION OF THE DRAWINGS

For a better understanding of the present invention, reference may be made to the accompanying drawings, in which.

DETAILED DESCRIPTION OF THE INVENTION

Figure 1:
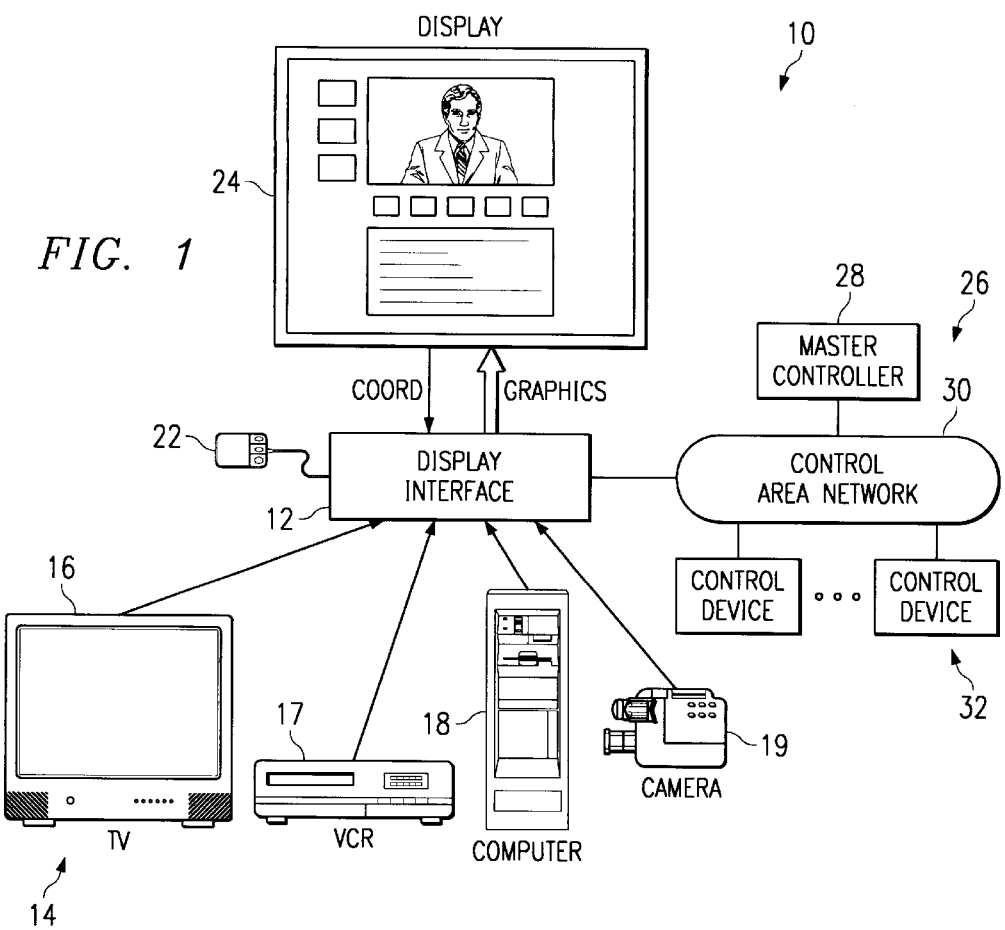
FIG. 1 is a simplified block diagram of an embodiment of a system for multimedia display according to the teachings of the present invention.

FIG. 1 is a simplified block diagram of an embodiment of a system for multimedia display 10 according to the teachings of the present invention. System 10 includes a display interface 12 which is operable to accept graphics and text input from a variety of sources 14. Graphics sources 14 may include a television 16 (or a receiver of television signals), a video cassette recorder (VCR) 17, a computer 18, and a camera 19. Other input sources may include digital video discs (DVDs), satellite receivers, video conferencing systems, etc. The inputs may be in the form of VGA, SVG, XGA, RGB, and other suitable formats. Display interface 12 is further operable to receive a pointing device, such as a mouse or touch pad 22. A display 24 such as a VGA monitor, RGB monitor, touch panel, etc. may be coupled to display interface 12. Display 24 may be a touch monitor or a monitor with a touch membrane overlay. Display 24 is operable to show a composite page consisting of one or more windows or "buttons" which display graphics from multiple sources 16–19 coupled to display interface 12.

Display interface 12 may be coupled to a control system 26, which may include a master controller 28, which is coupled to a control area network (CAN) 30. Also coupled to control area network 30 and under the control of master controller 28 are control devices 32. Control devices 32 may be lights, audio-visual equipment, user displays, security equipment, fire detection equipment, and other equipment and devices. Control devices 32 may include sources of graphics content, which may be communicated to master controller 28 via control area network 30 to display interface 12. Display 24 thus may also display content from graphics sources coupled to control area network 30.

Figure 2:
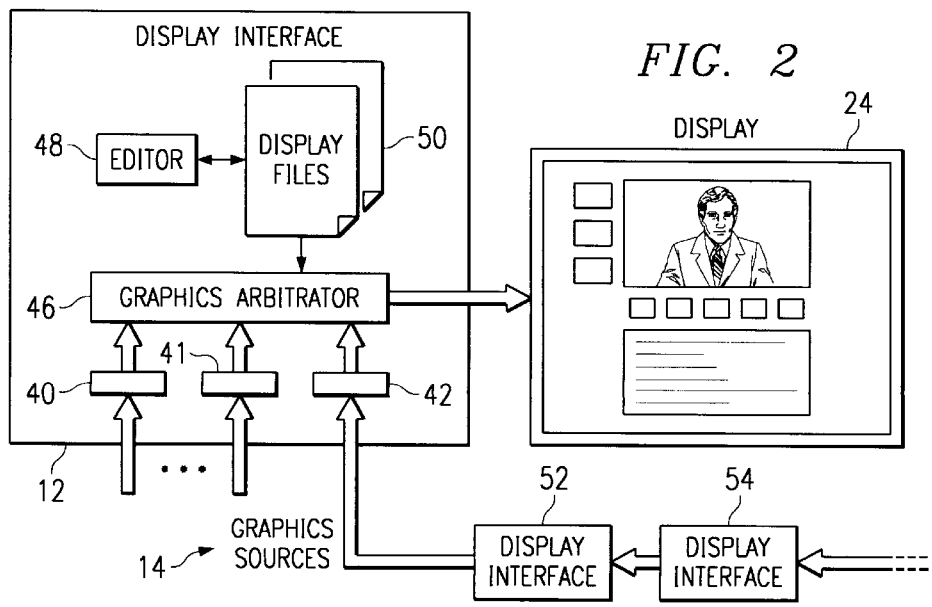
FIG. 2 is a more detailed block diagram of an embodiment of the display interface according to the teachings of the present invention.

FIG. 2 is a more detailed block diagram of an embodiment of the display interface 12 according to the teachings of the present invention. Display interface 12 includes one or more connectors or slots 40–42 to receive graphics sources 14.

Graphics sources 14 may be coupled to graphics input cards or modules which may connect to connectors or slots 40–42. It may be seen that a graphics source for display interface 12 may be another display interface 52, which may in turn be coupled to yet another display interface 54 in a daisy chain fashion. Therefore, a graphics input source coupled to display interfaces 52 and 54 may be displayed on display 24 coupled to display interface 12 along with control devices 32 of control area network 30. Graphics sources 14 are coupled to a graphics arbitrator 46 via connectors 40–42. Graphics arbitrator 46 provides a graphics output that may include a combination of graphics generated internally, video information from all graphics sources 14 and other sources coupled to display interface 12. The graphics output is provided to and displayed by display 24.

Graphics arbitrator 46 generates the graphics output in response to display files 50, which are generated by an editor 48. A user or installer may initiate editor 48, which is an application program executing on a central processing unit (CPU) of display interface 12. The user may define and designate multiple windows or buttons in which graphics content from various sources 14 is displayed.

Figure 3:
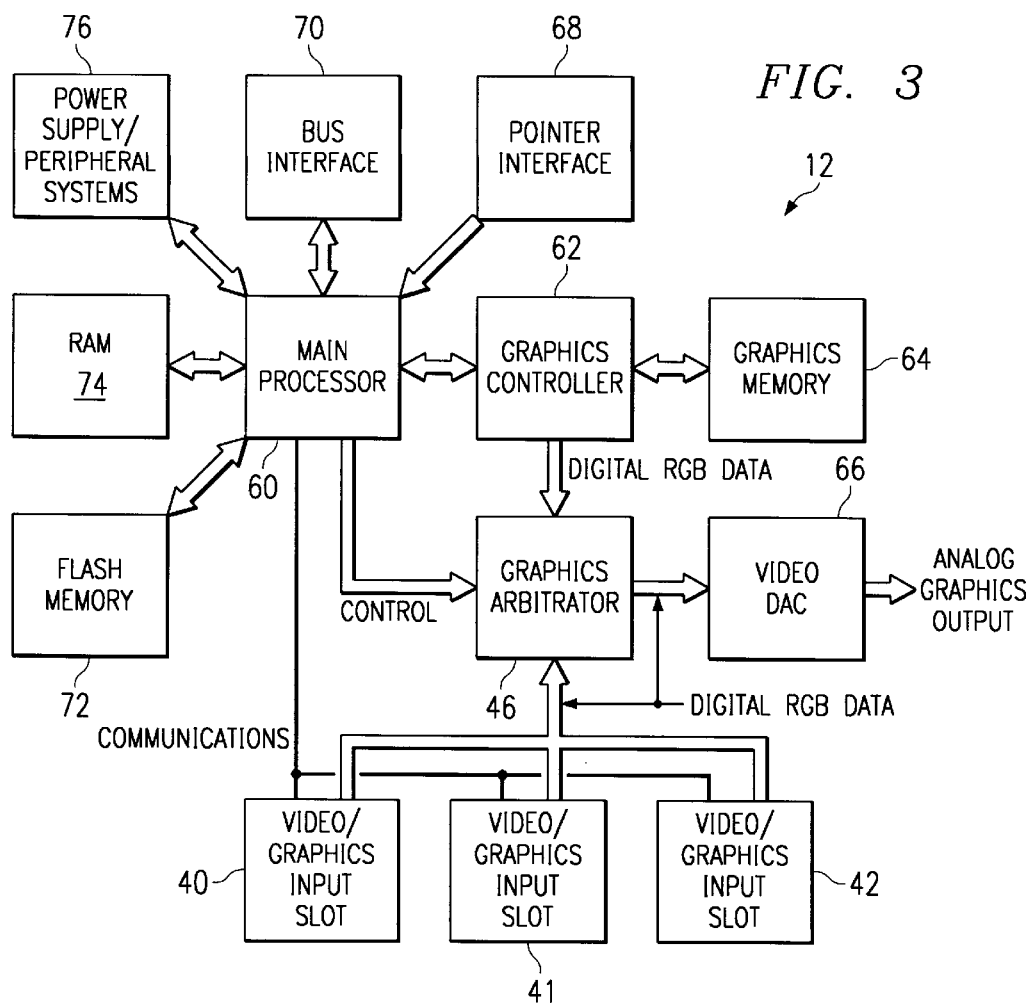
FIG. 3 is a detailed block diagram of an embodiment of the display interface according to the teachings of the present invention.

FIG. 3 is a detailed block diagram of an embodiment of the display interface 12 according to the teachings of the present invention. Display interface 12 includes three video/graphics input slots or connectors 40–42 for receiving graphics information from at least three graphics sources. In one embodiment, video graphics cards operable to receive and process certain particular types of graphics data may be plugged into slots 40–42. For example, a graphics card may be provided that is operable to couple to consumer-type sources, such as VCRs and DVDs. Such graphics card may include S-video input connectors and/or composite input connectors. Another graphics card may include RGB connectors operable to couple to RGB-type sources. Yet another graphics card may include VGA connectors for coupling with VGA-type sources. In general, the graphics cards are operable to decode a given type of video signal into 24-bit RGB, then buffering, scaling, and outputting a specific number of pixels at a time to graphics arbitrator 46 in sync with the horizontal and vertical sync signals from main processor 60. Main processor 60 may request a graphics card to scale its output image by sending it commands. The output image can be adjusted so that the active video data appears in the requested rectangular area. For example, main processor 60 may generate and send a SET OUTPUT RECTANGLE command message with the coordinates of the four corners of the output rectangle as parameters.

Coupled to video/graphics input slots 40–42 is graphics arbitrator 46. Graphics arbitrator is under the control of main processor 60. Main processor 60 also controls a graphics controller 62, which generates a pixel clock signal that cycles once for every pixel on the display. The pixel clock signal is distributed to video/graphics input slots 40–42 and is used as the main video timing signal. Graphics controller 62 also generates the internal graphics or RGB data for each pixel, which is provided to graphics arbitrator 46. Also provided to graphics arbitrator 46 are video or RGB data from one or more slots 40–42. Graphics arbitrator 46 is operable to select the correct pixel for output and provide it to a video digital-to-analog converter 66, which generates an analog graphics output.

Graphics controller 62 is coupled to a graphics memory 64 which provides data storage therefor. A pointer interface 68 is provided to coupled to a pointing device 22, such as a serial mouse. A bus interface 70 is provided for coupling and communicating with control area network 30. A flash memory 72, random access memory (RAM) 74, and a power supply/peripheral systems 76 are also included in display interface 12.

In operation, output pixel selection by graphics arbitrator 46 is performed by examining the color of each pixel arriving from graphics controller 62. Three predetermined colors have been selected as keys or indicators for the three slots. If a pixel is one of the three predetermined colors, then the pixel from the corresponding slot is selected as the output. If the pixel is of any other color, the graphics controller video graphics is chosen as the output source for that pixel. Therefore, graphics arbitrator examines the color of each pixel as it arrives from graphics controller 62. If the color of a given pixel is not one of the key colors, then the pixel is passed to video digital-to-analog converter 66 unchanged. If the pixel color is one of the key colors, then the pixel coming from the selected slot is passed to the output.

Figure 4:
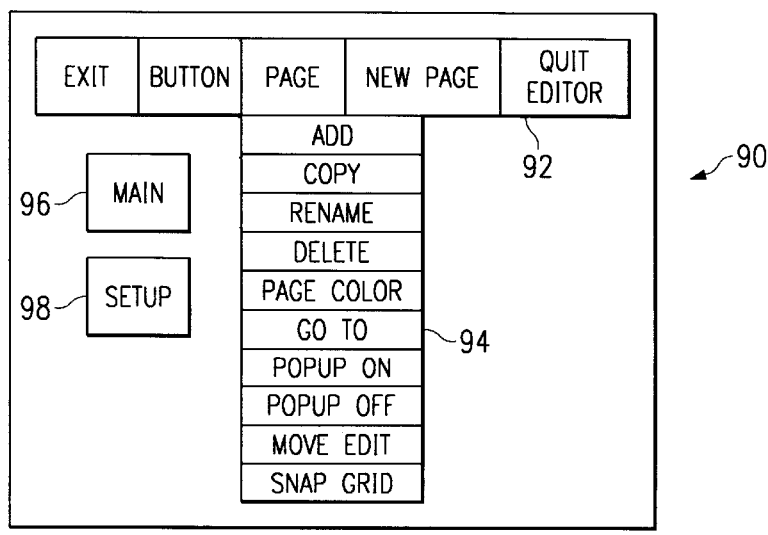
FIG. 4 is an exemplary screen of a main editor page with a page editing menu according to the teachings of the present invention.

FIG. 4 is an exemplary screen of a main editor page 90 of editor 48 (FIG. 2) with a page editing menu according to the teachings of the present invention. Editor 48 is used to create and define the layout of the graphics display on the display monitor. Main editor page 90 may include an edit tool bar 92, which may include options: EXIT, BUTTON, PAGE, NEW PAGE, and QUIT EDITOR. A drop-down menu 94 for the PAGE option is shown, which includes several actions such as: add, copy, rename, delete, page color, go to, pop-up on, pop-up off, move editor, and snap grid. A page may be defined as a window which may occupy the entire or a portion of the display monitor screen. A page may include one or more buttons in which graphics content may be displayed. Also included may be a main button 96 for navigating to a main page and a setup button 98 for navigating to a setup page.

Figure 5:
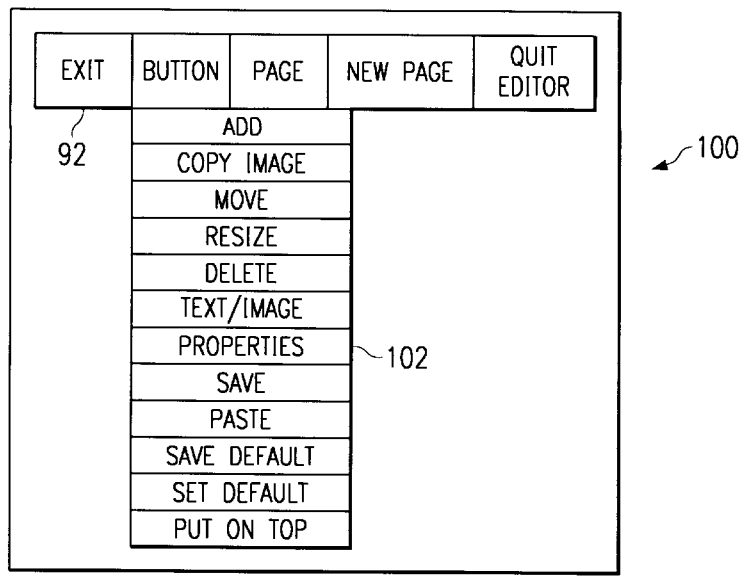
FIG. 5 is an exemplary screen of a main editor page with a button editing menu according to the teachings of the present invention.

FIG. 5 is an exemplary screen of a main editor page 100 with a button editing menu according to the teachings of the present invention. Main editor page 100 may include a edit tool bar 92 with a button pull-down menu 102 shown. Button pull-down menu 102 may include actions: add, copy image, move, resize, delete, text/image, properties, save, paste, save default, set default, and put on top.

Figure 6:
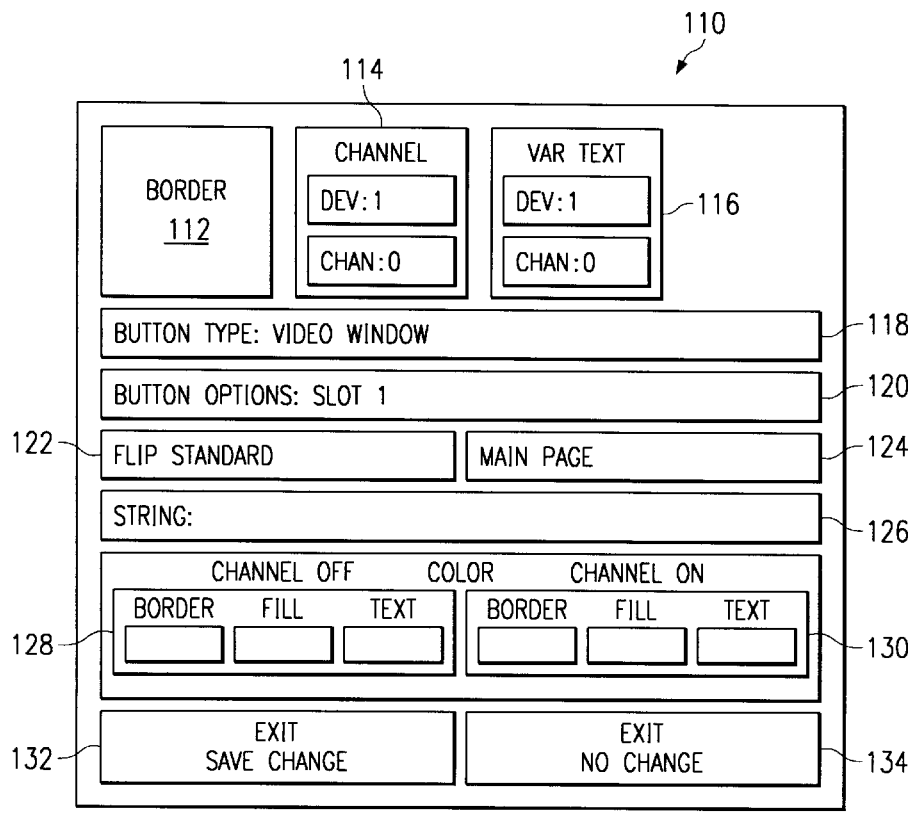
FIG. 6 is an exemplary screen of a button property editing page according to the teachings of the present invention.

When the properties action is selected from button pull-down menu 102, an exemplary screen of a button property editing page 110 according to the teachings of the present invention is shown in FIG. 6. A video window is a type of button used to display a video feed from a graphics source. Video window buttons can be moved, resized and customized. Button property editing page 110 includes a border button 112, for setting the button border. The button border property may include any number of ways to display or represent the border of the button, such as no border, single line, double line, triple line, single rounded, double rounded, single raised, double raised, 3D rectangle, 3D round, single diamond, etc. A button 114 is further provided in page 110 to set the channel code. The channel code allows a button to be associated with a specific function. A device (DEV) code is an identifier assigned to control devices coupled to master controller 28 via control area network 30 (FIG. 1). The CHAN designation on button 114 is the button channel assignment. Each device may have one or more channels. The next button, VAR TEXT 116, sets the variable text code for the channel and device assignments. The button type is set by the next field 118. Buttons may be of the following exemplary types: general, joystick, vertical bargraph, horizontal bar graph, keypad, keyboard, video window, etc. Button option 120 provides the user the ability to supply additional setup information about the button. For example, a video window button option would prompt the user to supply the slot number of the graphics source. Display interface then automatically detects the signal type of the graphics source connected to the given slot and set the video attributes accordingly. The user may be given the opportunity to fine tune and optimize the VGA or RGB picture quality of the video window. Flip type button 122 is used to specify a page flip type and the next button 124 is used specify the page to flip to. For example, if the user specifies "Flip Standard" and "Main Page", then when the present button is pushed, a page named "Main Page" is displayed. The next button, string 126, allows the user to specify a string associated with the button to be displayed.

Buttons 128 and 130 are used to set the channel-off and channel-on display conditions of the button. The color of the border, the fill color, and the text of the channel-off and channel-on conditions of the button are specified. When property editing is completed, the user may exit and save the changes by pressing on button 132, or exit without saving the changes by pressing on button 134.

Figure 7:
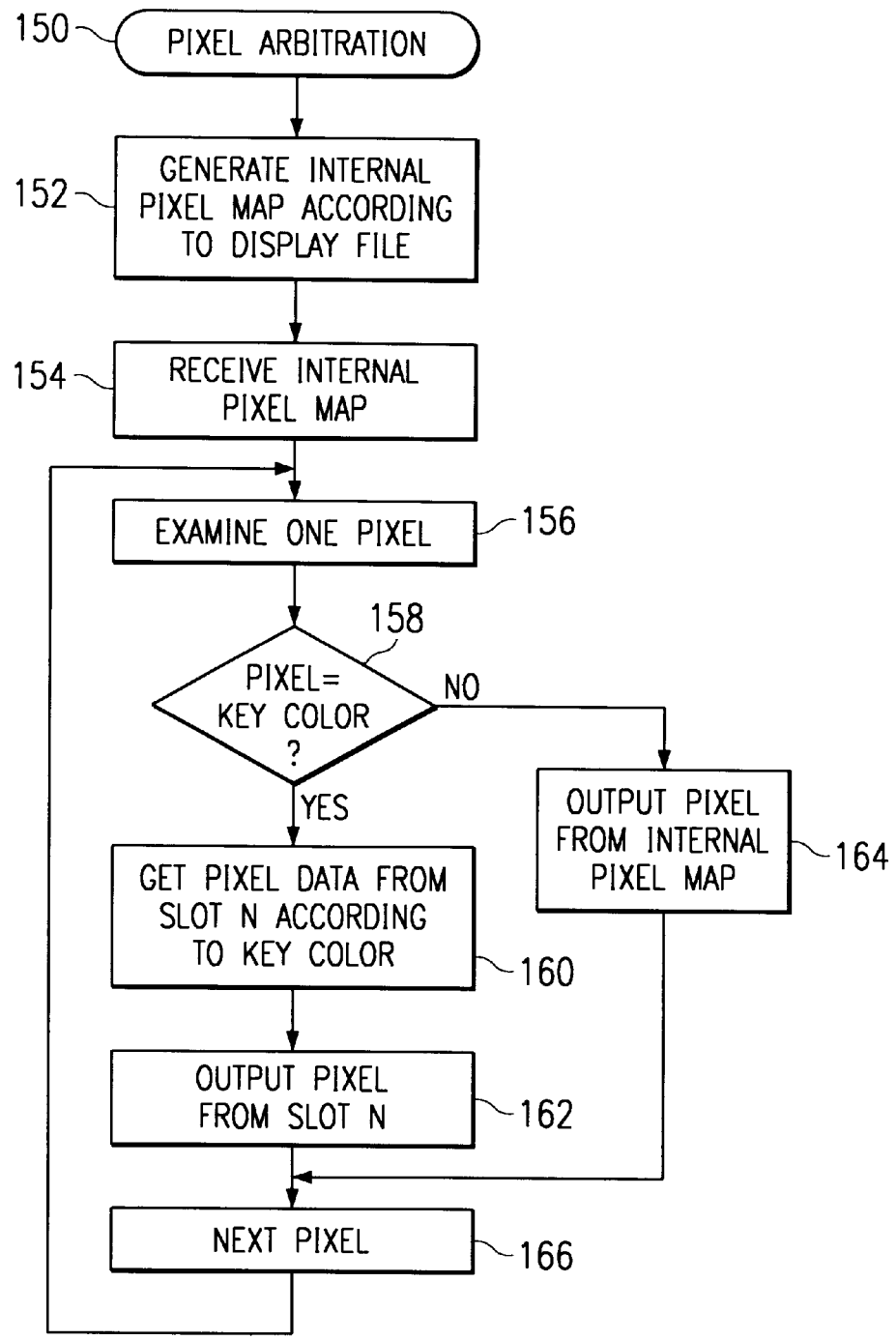
FIG. 7 is an exemplary flowchart of a graphics arbitration process according to the teachings of the present invention.

Referring to FIG. 7, a flowchart of an exemplary graphics arbitration process 150 of the present invention is shown. In block 152, graphics controller 62 generates an internal pixel map according to the display file. As described above, the display file contains the coordinates, size, and other information about the buttons on a given page. Some button properties may specify that video feed from one or more of the graphics sources 14 are to be displayed for a given button. In blocks 154 and 156, graphics arbitrator 46 receives the internal pixel map from graphics controller 62 and examines the value of one pixel. If the pixel color value is a predetermined key color, then the desired display for that pixel is from a video feed from one of the graphics sources rather than the graphics generated by graphics controller 62. As described above, each graphics source is assigned a color value which function as a key. When the special key color is encountered, it is indicative that the pixel from the graphics source represented by that key color is to be displayed. If the pixel has a color value that matches one of the key colors, as determined in block 158, then the pixel data from the slot represented by that key color is obtained from the specified slot and output to video digital-to-analog controller 66 for output to the monitor.

If in block 158 it is determined that the pixel value is not a key color, then the pixel data from the internal pixel map is provided as output to video digital-to-analog controller 66 for output to the monitor. In block 166, the next pixel in the internal pixel map is obtained, and execution loops back to block 156 to examine its value. This process continues until the display interface is powered down.

Operating in this manner, graphics content from a number of sources may be combined and displayed on a single page on a monitor screen. The graphics sources may be those devices directly connected to the display interface, devices coupled to one or more additional display interfaces which are coupled together, or devices coupled to a control area network.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system of multimedia display on a monitor screen comprising:

at least one graphics source, each graphics source disposed to provide graphics information and having an associated key color value;

a display file defining a page having a plurality of windows, each window having a set of properties and disposed to display graphics information received from a specified one of the graphics sources;

a graphics controller operable to generate a pixel map according to the display file; and a graphics arbitrator coupled to the graphics controller and operable to examine each pixel in the pixel map in order to select a pixel to be displayed for the page according to the display file, the graphics arbitrator being further operable to select the pixel to be displayed from a particular graphics source when the examined pixel matches the key color value of the particular graphics source, and to select the examined pixel as the pixel to be displayed when the examined pixel does not match the key color value of any of the graphics sources.

2. The system, as set forth in claim 1, wherein:

the system comprises a plurality of the graphics sources.

3. The system, as set forth in claim 1, wherein the at least one graphics source comprises a video cassette recorder.

4. The system, as set forth in claim 1, wherein the at least one graphics source comprises a camera.

5. The system, as set forth in claim 1, wherein the at least one graphics source comprises a television signal receiver.

6. The system, as set forth in claim 1, wherein the at least one graphics source comprises a computer.

7. The system, as set forth in claim 1, further comprising a control area network coupled to a display interface comprising the at least one display file, the graphics controller and the graphics arbitrator.

8. The system, as set forth in claim 7, wherein the control area network comprises:

a master controller;

at least one control device;

at least one graphics source; and a network coupled to the master controller, the at least one control device, the at least one graphics source, and the display interface.

9. The system, as set forth in claim 1, further comprising an editor operable to edit the window properties.

10. A control area network having a multimedia display, comprising:

a master controller coupled to the control area network;

at least one control device coupled to the master controller via the control area network, the control area network coupled to a display interface, the display interface comprising:

at least two graphics sources, each graphics source having an associated key color value;

a display file defining a page having a plurality of buttons, each button having a set of properties and disposed to display graphics information received from a specified graphics source;

a graphics controller operable to generate a pixel map; and a graphics arbitrator coupled to the graphics controller and operable to examine each pixel in the pixel map in order to select a pixel to be displayed on a monitor screen for the page according to the display file, the graphics arbitrator being further operable to select the pixel to be displayed from a particular graphics source when the examined pixel matches the key color value of the particular graphics source, and to select the examined pixel as the pixel to be displayed when the examined pixel does not match any graphics source key color value.

11. The network, as set forth in claim 10, wherein the button properties further comprises:

a location of the button on the screen; and size of the button.

12. The system, as set forth in claim 10, wherein the at least two graphics sources comprise a video cassette recorder.

13. The network, as set forth in claim 10, wherein the at least two graphics sources comprise a camera.

14. The network, as set forth in claim 10, wherein the at least two graphics sources comprise a television signal receiver.

15. The network, as set forth in claim 10, wherein the at least two graphics sources comprise a computer.

16. The network, as set forth in claim 10, further comprising an editor operable to edit the button properties.

17. The system, as set forth in claim 10, wherein the monitor is a touch panel.

18. The control area network according to claim 10, wherein one of the graphics sources is an internal pixel map.

19. A method of multimedia display on a monitor screen, comprising the steps of:

composing at least one display file describing multiple buttons, each button having a set of properties and disposed to display graphics information received from a specified one of a plurality of graphics sources, each graphics source having an associated key color value;

receiving a pixel from one of the graphics sources;

generating a corresponding pixel in response to the at least one display file;

examining the generated pixel;

selecting and displaying the examined pixel whenever the color value of the examined pixel does not match any key color value for associated with the plurality of graphics sources; and selecting and displaying a pixel received from a particular graphics source whenever the color value of the examined pixel matches the predetermined key color associated with the particular graphics source.

20. The method, as set forth in claim 19, wherein examining the generated pixel comprises determining whether each generated pixel has a predetermined key color value, each predetermined key color value indicative of a specific graphics source.

21. The method, as set forth in claim 19, further comprising outputting the selected pixel to the monitor screen for display.

22. The method according to claim 19, wherein one of the plurality of graphics sources is an internal pixel map.

23. A method of multimedia display on a monitor screen comprising the steps of:

receiving an internal pixel map according to a display file describing at least two buttons, each button having a set of properties and disposed to display graphics information received from a specified graphics source, each graphics source having an associated key color;

examining each pixel in the internal pixel map, each examined pixel having a color;

whenever the color of the examined pixel, matches the key color of a particular graphics source, getting a corresponding pixel from the particular graphics source and outputting the corresponding pixel for display on the monitor screen; and whenever the examined pixel does not match any of said associated key colors, outputting the examined pixel for display on the monitor screen.

24. The method, as set forth in claim 23, further comprising the step of generating the internal pixel map.

25. The method, as set forth in claim 23, wherein the monitor screen is a touch monitor screen.

26. The method, as set forth in claim 23, wherein the step of examining each pixel in the internal pixel map further comprises the step of determining whether the examined pixel is equal to a key color.

27. The method, as set forth in claim 23, further comprising the step of assigning the key color to one of the buttons.

* * * * *